2,758,996

3,4-DIHYDRO-2-QUINAZOLINES AND PROCESSES FOR THE PRODUCTION THEREOF

Richard A. Robinson, Morton Grove, Ill., assignor, by mesne assignments, to G. D. Searle & Co., Skokie, Ill., a corporation of Delaware No Drawing. Application September 1, 1953, Serial No. 377,986

7 Claims. (Cl. 260—251)

This invention relates to 3,4-dihydro-2-quinazoline derivatives and to processes for the preparation thereof. In particular, this invention relates to quinazoline derivatives of the formula

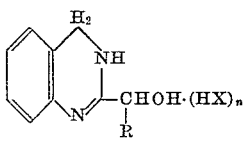

wherein R is a lower alkyl radical containing not more than 4 carbon atoms; X is one equivalent of an anion; and $n$ is either zero (where the compound is a tertiary base), or it is 1 (where the compound is a salt comprising 1 molecule of tertiary base plus one equivalent of an acid).

In the foregoing structural formula, R represents such lower alkyl radicals as methyl, ethyl, propyl, isopropyl, butyl, isobutyl and secondary butyl radicals. The substituent X represents one equivalent of such non-toxic anions as chloride, bromide, iodide, methyl sulfate, ethyl sulfate, benzenesulfonate, toluenesulfonate, tartrate, succinate, malate, acetate, citrate, sulfate, phosphate, sulfamate, and the like.

The compounds of this invention are of value in the treatment of bronchial asthma and for clearance of the tenacious mucous secretions associated with this and other respiratory disorders. As broncho-dilators, the instant compounds expand the lumina of the pulmonary passages; and as expectorants, they promote the expulsion of mucus or other exudate from the lungs, bronchi, and trachea.

The amine bases which comprise this invention are relatively insoluble in water but may be dissolved in dilute acids and in most of the common organic solvents. The acid addition salts of this invention are, on the other hand, readily soluble in water and in aqueous solutions of alcohols or other water-miscible organic solvents. The subject compounds may be administered in solid form as tablets or capsules; dissolved in aqueous media, they may be given parenterally.

The compounds to which this invention relates are conveniently prepared according to the following procedure: An α-acyloxyalkanoyl halide—for example, α-acetoxypropionyl chloride—is reacted with anthranilic acid nitrile in the presence of an alkaline condensing agent—for example, pyridine—at temperatures between 5 and 25° centigrade for periods of time ranging between 30 minutes and upward of 3 hours, using an inert, nonpolar organic solvent—for example, benzene—as the reaction medium, to give the corresponding N-(α-acyl-oxyalkanoyl)anthranilonitrile. Low pressure (of the order of 25 to 135 pounds per square inch), room temperature hydrogenation of the nitrile thus obtained, using nickel and ammonium chloroplatinate (or their equivalents) as catalysts, and preferably but not necessarily in the presence of potassium carbonate (as a condensing agent), serves to reduce the cyano group and effect ring closure of the resultant diamine to the desired α-alkyl-3,4-dihydro-2-quinazolinemethanol of this invention. The subject tertiary bases are converted to the acid addition salts of this invention by simple admixture of a selected base with one equivalent of any of various inorganic and strong organic acids, the anionic portion of which conforms to the definition of X as set forth above.

The following examples will illustrate in detail certain of the quinazoline derivatives which constitute the present invention and methods which have been devised for their preparation. However, the invention is not to be construed as limited thereby either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (°C.), pressures in millimeters (mm.) of mercury, and relative amounts of materials in parts by weight, except as otherwise noted.

Example 1

A. *N-(α-acetoxypropionyl)-anthranilonitrile.*—To a solution of 15 parts of o-anthranilonitrile—prepared from o-nitroaniline by diazotization, Sandemeyer conversion to the corresponding nitrile, and subsequent reduction with tin and muriatic acid—in a mixture of 175 parts of benzene and 15 parts of pyridine is added at 10–15° C. over a 30 minute period, with stirring, a solution of 21 parts of α-acetoxypropionyl chloride—prepared from lactic acid, acetyl chloride, and thionyl chloride according to conventional procedure detailed by Bertram, Ber., 37, 3971 (1904)—in 130 parts of benzene. When the addition is complete, agitation is continued 30 minutes longer at the stipulated temperature, following which the pyridine hydrochloride formed in process is filtered from the reaction mixture and then suspended in cold water. The hydrochloride rapidly goes into solution, leaving behind a small amount of occluded N-(α-acetoxypropionyl)-anthranilonitrile, which, insoluble in the aqueous medium, is filtered therefrom and later combined with the main crop of product which is recovered from the reaction mixture filtrate as follows: The (reaction mixture) filtrate is stripped of solvent at reduced pressures and the oily residue then covered with cold water, whereupon the residue solidifies. This material, which constitutes the bulk of the reaction product, is separated and combined with the material recovered from the pyridine hydrochloride fraction above. Washed thoroughly with cold water, and then with small portions of isopropyl alcohol, it is recrystallized from 4 volumes of the latter solvent to give, in good yield, N-(α-acetoxypropionyl)-anthranilonitrile, M. P. 88–90° C.

B. *3,4-dihydro-α-methyl-2-quinazolinemethanol.* — A solution of 16 parts of the acetylated nitrile of the foregoing Part A in 235 parts of absolute methyl alcohol is hydrogenated at room temperatures and approximately 50 pounds per square inch pressure, using 5 parts of activated Raney nickel and 0.075 part of ammonium chloroplatinate as catalysts, and 1 part of potassium carbonate as a condensing agent. The reaction is complete in less than 1 hour, 2 mole equivalents of hydrogen being absorbed. Solvent is stripped in vacuo; and the residue, which crystallizes on cooling, is suspended in a warm solution of 5 parts of potash in 50 parts of water for about 30 minutes, to insure complete saponification of the acetoxy group. The product is then recovered on a filter, washed thereon with water, and finally dried in air. Recrystallized from methyl alcohol, it shows M. P. 178–179° C.

C. *3,4-dihydro-α-methyl-2-quinazolinemethanol hydrochloride.*—The tertiary base of the foregoing Part B is converted to the hydrochloric acid addition salt by reaction of a solution thereof in anhydrous ether with one equivalent of an absolute isopropyl alcohol solution of hydrogen chloride. The salt thus produced, recrystallized from absolute ethyl alcohol, shows M. P. 217–218° C. It has the formula

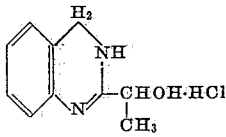

*Example 2*

A. *N-(α-acetoxy-n-butyryl)-anthranilonitrile.*—A solution of 18 parts of anthranilonitrile—prepared as described in Example 1A—and 12 parts of pyridine in 175 parts of anhydrous benzene is cooled to 8–12° C. At this temperature, a solution of 25 parts of α-acetoxy-n-butyryl chloride—prepared in conventional fashion from α-bromo-n-butyric acid by seriatim treatment with potassium carbonate, acetyl chloride, and phosphorus trichloride in 90 parts of benzene is cautiously added with continuous agitation. The addition requires about half an hour, following which the reagents are maintained for an additional 10 minutes at 8–12° C., then washed well with water to extract pyridine hydrochloride, and finally dried over sodium sulfate. The solution is next treated with decolorizing charcoal, then filtered; and finally, the filtrate is stripped of solvent by vacuum distillation. The residue, which solidifies on cooling, is washed successively with petroleum ether and anhydrous (ethyl) ether. Recrystallized from isopropyl alcohol, it shows M. P. approximately 95° C.

B. *α-Ethyl-3,4-dihydro-2-quinazolinemethanol.* — The acetylated nitrile of the foregoing Part A is reduced, and ring closure effected, by reaction of a solution of 22 parts of the nitrile in 235 parts of methyl alcohol with hydrogen at a pressure of approximately 50 pounds per square inch in the presence of 5 parts of activated Raney nickel catalyst, approximately 0.1 part of ammonium chloroplatinate catalyst, and 2 parts of anhydrous potassium carbonate. The reduction, carried on at room temperatures, is completed in less than 1 hour with the absorption of 2 mole equivalents of hydrogen. The catalyst is filtered out, and the filtrate is then stripped of solvent at reduced pressures. A solution of 2 parts of caustic soda in 50 parts of water is added to the residue; and the combined materials are kept well mixed for a period of 30 minutes, assuring complete saponification of the product. The latter is filtered out, washed well with water, and finally recrystallized from isopropyl alcohol to give the desired tertiary base, M. P. 139–140° C.

C. *α-Ethyl-3,4-dihydro-2-quinazolinemethanol hydrochloride.*—The tertiary base of the foregoing Part B is converted to the acid addition salt by reaction thereof in anhydrous ether solution with one equivalent of an absolute isopropyl alcohol solution of hydrogen chloride. The product, purified by crystallization from a mixture of isopropyl alcohol and methyl alcohol, shows M. P. 216–217° C. It has the formula

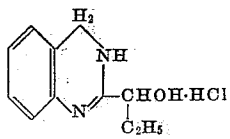

*Example 3*

A. *N-(α-acetoxy-n-caproyl)-anthranilonitrile.* — To a solution of 24 parts of anthranilonitrile—derived as described in Example 1A—and 20 parts of pyridine in 200 parts of anhydrous benzene at temperatures in the neighborhood of 10° C. is cautiously added a solution of 38 parts of α-acetoxy-n-caproyl chloride—derived in conventional fashion from α-bromo-n-caproic acid by appropriate treatment with potassium carbonate, acetyl chloride, and phosphorus chloride, respectively—in 125 parts of anhydrous benzene. Continuous agitation and 10° C. temperatures are maintained throughout the addition and for half an hour thereafter, at which point the reactants are washed with water to dissolve out pyridine hydrochloride, then dried over sodium sulfate; and finally treated with decolorizing charcoal, in accordance with the procedure detailed in Example 2A. Stripping of the solvent in vacuo leaves the acetylated nitrile as a residue, which solidifies on cooling.

B. *α-n-Butyl-3,4-dihydro-2-quinazolinemethanol.*—The N-(α-acetoxy-n-caproyl)-anthranilonitrile of the foregoing Part A is converted to α-n-butyl-3,4-dihydro-2-quinazolinemethanol by hydrogenation of a solution of 19 parts thereof in 225 parts of absolute methyl alcohol at room temperatures and approximately 50 pounds per square inch hydrogen pressure, using 8 parts of activated Raney nickel and 0.8 part of ammonium chloroplatinate as catalysts, and in the presence of 2 parts of anhydrous potassium carbonate as a condensing agent. The reduction and ring closure is completed in approximately 1 hour, as shown by the absorption of 2 mole equivalents of hydrogen during that time. The product is isolated by the procedure detailed in Example 2B.

C. *α-n-Butyl-3,4-dihydro-2-quinazolinemethanol hydrochloride.*—A solution of the tertiary base of the foregoing Part B in anhydrous ether is treated with one equivalent of hydrogen chloride in absolute isopropyl alcohol solution, according to usual techniques. The α-n-butyl-3,4-dihydro-2-quinazolinemethanol hydrochloride thus produced has the formula

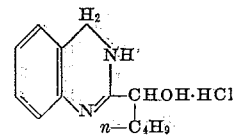

I claim:

1. A compound selected from the group consisting of bases and non-toxic acid addition salts thereof, said bases having the formula

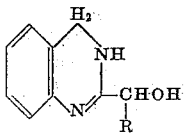

wherein R is a lower alkyl radical.

2. 3,4-dihydro-α-methyl-2-quinazolinemethanol hydrochloride.

3. α-Ethyl-3,4-dihydro-2-quinazolinemethanol hydrochloride.

4. α-n-Butyl-3,4-dihydro-2-quinazolinemethanol hydrochloride.

5. In a process for preparing compounds selected from the group consisting of bases and non-toxic acid addition salts thereof, said bases having the formula

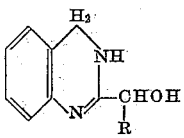

wherein R is a lower alkyl radical, the steps which comprise reacting an α-acyloxyalkanoyl halide with anthranilonitrile and pyridine in an inert, organic solvent to produce the corresponding N-(α-acyloxyalkanoyl)-anthranilonitrile and converting this compound to an α-alkyl-3,4-dihydro-2-quinazolinemethanol by reduction and ring closure thereof with hydrogen in the presence of activated Raney nickel and ammonium chloroplatinate as catalysts.

6. In a process for preparing compounds selected from the group consisting of bases and non-toxic acid addition salts thereof, said bases having the formula

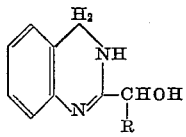

wherein R is a lower alkyl radical, the steps which comprise reacting α-acetoxyalkanoyl chloride with anthranilonitrile and pyridine in benzene solution to give N-(α-acetoxyalkanoyl)-anthranilonitrile which, in turn, is subjected to reductive ring closure by hydrogenation at pressures of approximately 50 pounds per square inch using activated Raney nickel and ammonium chloroplatinate as catalysts.

7. In a process for preparing compounds selected from the group consisting of bases and non-toxic acid addition salts thereof, said bases having the formula

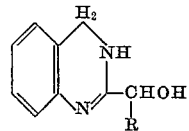

wherein R is a lower alkyl radical, the steps which comprise reacting α-acetoxyalkanoyl chloride with anthranilonitrile and pyridine in benzene solution to give N-(α-acetoxyalkanoyl)-anthranilonitrile which, in turn, is subjected to reductive ring closure by hydrogenation in the presence of anhydrous potassium carbonate at pressures of approximately 50 pounds per square inch using activated Raney nickel and ammonium chloroplatinate as catalysts.

No references cited.